(12) United States Patent
Leonard

(10) Patent No.: US 9,932,052 B2
(45) Date of Patent: Apr. 3, 2018

(54) CONFIGURABLE LOCOMOTIVE BRAKE CONTROLLER

(71) Applicant: NEW YORK AIR BRAKE, LLC, Watertown, NY (US)

(72) Inventor: Erich Leonard, Clayton, NY (US)

(73) Assignee: NEW YORK AIR BRAKE, LLC, Watertown, NY (US)

( * ) Notice: Subject to any disclaimer, the term of this patent is extended or adjusted under 35 U.S.C. 154(b) by 0 days.

(21) Appl. No.: 15/063,560

(22) Filed: Mar. 8, 2016

(65) Prior Publication Data

US 2016/0185365 A1    Jun. 30, 2016

Related U.S. Application Data

(63) Continuation of application No. 14/269,184, filed on May 4, 2014, now Pat. No. 9,321,468.

(51) Int. Cl.
| | |
|---|---|
| *B60T 13/66* | (2006.01) |
| *B61H 13/02* | (2006.01) |
| *B60T 15/04* | (2006.01) |
| *B60T 17/22* | (2006.01) |

(52) U.S. Cl.
CPC .............. *B61H 13/02* (2013.01); *B60T 15/04* (2013.01); *B60T 15/048* (2013.01); *B60T 13/66* (2013.01); *B60T 13/665* (2013.01); *B60T 17/228* (2013.01)

(58) Field of Classification Search
CPC ...... B60T 13/66; B60T 13/665; B60T 17/228; B60R 11/00; F16M 13/00; B60K 37/04

USPC ............... 188/1.11 E, 33; 303/3, 7, 15, 20; 264/167 R, 187 R, 187 E

See application file for complete search history.

(56) References Cited

U.S. PATENT DOCUMENTS

| | | | | |
|---|---|---|---|---|
| 3,974,994 | A * | 8/1976 | Petterson | F16F 15/02 248/663 |
| 4,019,710 | A * | 4/1977 | O'Connor | F16M 11/14 248/181.2 |
| 4,415,136 | A * | 11/1983 | Knoll | F16M 11/22 248/181.2 |
| 4,763,151 | A * | 8/1988 | Klinger | F16M 11/041 248/179.1 |
| 4,986,503 | A * | 1/1991 | Kabat | B63B 17/00 248/181.2 |
| 5,322,255 | A * | 6/1994 | Garrett | F16M 11/10 248/299.1 |
| 5,615,930 | A * | 4/1997 | McGrath | B60T 7/20 303/124 |
| 5,842,672 | A * | 12/1998 | Sweere | A47B 21/00 248/278.1 |

(Continued)

*Primary Examiner* — Thomas W Irvin
(74) *Attorney, Agent, or Firm* — Bond Schoeneck and King PLLC; David Nocilly

(57) ABSTRACT

A locomotive brake controller that has a body configured to interconnect to a desktop location in the cab of a locomotive and a mount that can attach the base of the controller to a vertical stand in the cab of a locomotive. The controller also includes an operator interface adaptor that can be clocked relative to the body and an operator face plate that can be clocked relative to the mount depending on the location of installation to ensure proper tilting of the interface relative to the operator and proper orientation of the operator display. Alternatively, the adaptor may include a fixed face plate that includes a moveable display and an adhesive membrane with operator buttons to properly orient the display.

17 Claims, 10 Drawing Sheets

(56) References Cited

U.S. PATENT DOCUMENTS

| | | | | |
|---|---|---|---|---|
| 6,419,055 B1 * | 7/2002 | Walsh | .................... | B60K 37/04 |
| | | | | 188/206 R |
| 6,619,759 B2 * | 9/2003 | Bradsen | .................... | B60T 7/20 |
| | | | | 188/206 R |
| 7,300,024 B2 * | 11/2007 | Slatosch | ............. | B60R 11/0235 |
| | | | | 248/27.1 |
| D584,695 S * | 1/2009 | Hilsbos | ........................ | D13/168 |
| 8,746,812 B2 * | 6/2014 | Albright | .................... | B60T 7/20 |
| | | | | 303/123 |
| 9,004,783 B1 * | 4/2015 | Woodman | .............. | F16M 11/00 |
| | | | | 396/419 |

* cited by examiner

CONFIGURABLE LOCOMOTIVE BRAKE CONTROLLER

CROSS-REFERENCE TO RELATED APPLICATIONS

The present application is a continuation of U.S. application Ser. No. 14/269,184, filed on May 4, 2014.

BACKGROUND OF THE INVENTION

1. Field of the Invention

The present invention relates to locomotive brake controllers and, more specifically, to a controller than can be mounted in either a desktop or vertical configuration by reorienting the component parts.

2. Description of the Related Art

Many variations exist in the locomotive brake system human-machine interface. These variations include differences in the orientation and location of the brake controller. For example, the ergonomics and readability of a particular display located on the controller can cause variations in the orientation and location in the shape and form factor of the external surface of the controller.

Controllers are typically mounted either vertically on a wall to the left of the operator or horizontally on a desktop in front of the operator. The installation mount used for mounting a controller in either of these two locations varies. For example, the vertical mounting orientation has a defined envelope for mounting based on previous brake valve arrangements. By contrast, the desktop mounting pattern is more compact and is based on brake valves previously used in the desktop location.

In fully pneumatic brake valve arrangements, the valves, whether vertical or desktop, have physical differences based on their functionality and thus do not have a common envelop to which the controller may be mounted. In addition, electro-pneumatic systems may have to fit within pre-existing mounting locations, such as those of fully pneumatic brake valve systems, and thus are restricted by the form and ergonomics of the mounting location rather than the actual valve functions and form factor driven by those functions.

As a result of the wide variety of variations involved in fitting a controller to an existing mounting location and the ergonomics of the operator, conventional systems require the use of large machined or cast parts that are adapted to the particular mounting location, thereby significantly increasing the cost of adapting to these variations. This variability also results in the need for brake system manufacturer to stock and inventory the multiple component parts needed to handle these variations. Thus, there is a need in the art for a controller that can be installed in either a vertical or a desktop orientation without the need for each part to be specifically designed for just one of the potential orientations.

BRIEF SUMMARY OF THE INVENTION

The present invention comprises a locomotive brake controller that is easily configurable to either a desktop or a vertical stand installation while avoiding the need for specific mounting hardware or having components that are designed for just one of the installation options. More specifically, the controller includes a body for housing the various operator interface elements and a beveled mount that can be clocked between various orientations depending on the particular orientations. In addition, the controller includes an operator interface that may also be clocked between various orientations so that the rotation of both the mount and the interface allows for proper installation of controller in either a desktop or vertical stand position, thus significantly reducing the number of components that specific to a particular orientation and allowing for nearly all of the same components to be used regardless of whether the controller is to be installed in desktop configuration or a vertical configuration.

BRIEF DESCRIPTION OF THE SEVERAL VIEWS OF THE DRAWING(S)

The present invention will be more fully understood and appreciated by reading the following Detailed Description in conjunction with the accompanying drawings, in which.

DETAILED DESCRIPTION OF THE INVENTION

Figure 1:
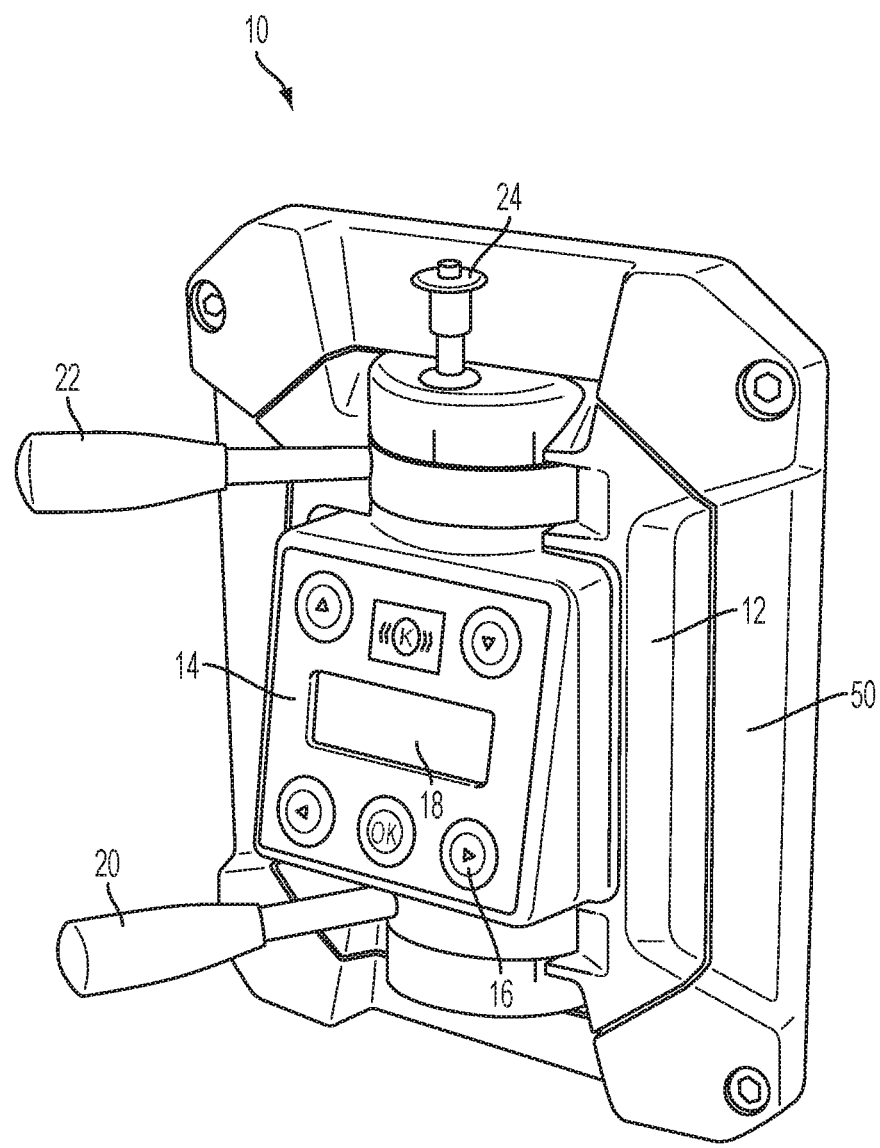
FIG. 1 is a perspective view of a locomotive brake controller according to the present invention that is configured for a vertical stand installation.

Referring now to the drawings, wherein like reference numerals refer to like parts throughout, there is seen in FIG. 1 an assembled locomotive brake controller 10, such as a computer controlled brake control module that is the interface between the braking system of the a train and the locomotive engineer. Controller 10 comprises a body 12 supporting an operator interface module 14 that includes a plurality of operator buttons 16 as well as a user display 18, such as a digital display or flat screen that provides instantaneous information on the equalizing reservoir target pressure of a pneumatic braking system. Controller 10 further includes a pair of operator handles 20 and 22, as well as locking pin 24, typically installed when controller 10 is installed in a vertical orientation, such as by mounting to an AAR control stand in the cab of a locomotive. Locking pin 24 can be replaced by a plug of the same attachment method, or be installed as well in the desktop orientation.

Figure 2:
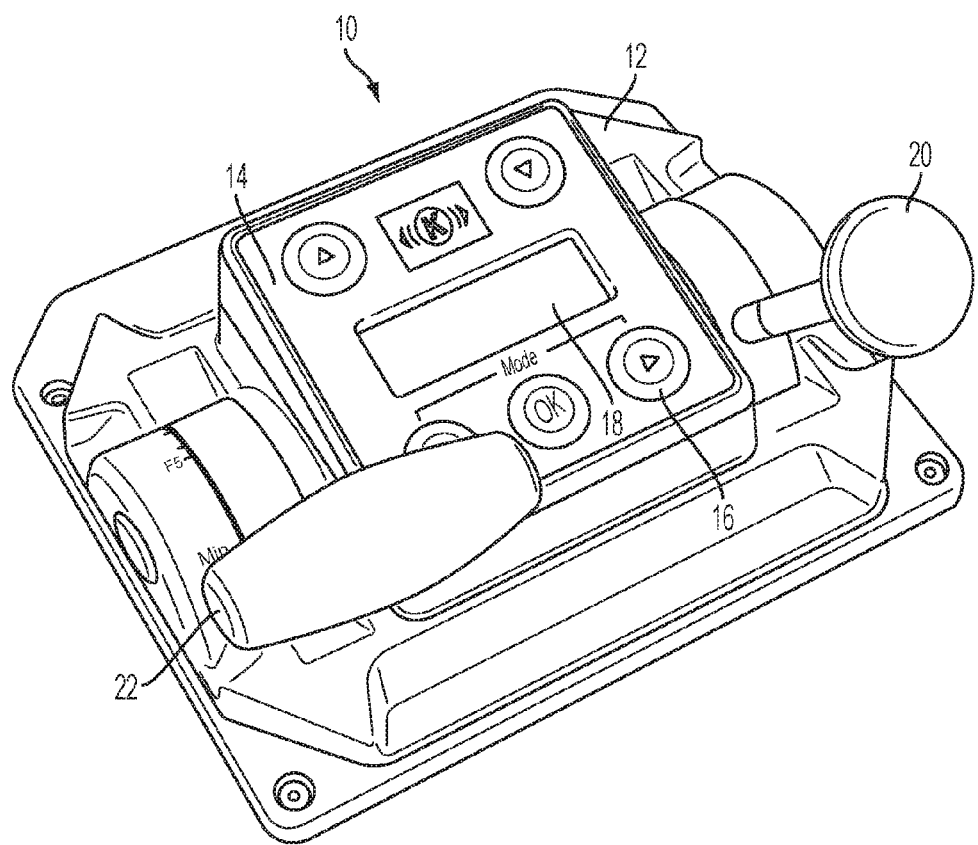
FIG. 2 is a perspective view of a locomotive brake controller according to the present invention that is configured for a desktop installation.

Referring to FIG. 2, controller 10 may also be installed in the cab of a locomotive in a desktop orientation using nearly all of the same components, albeit arranged in a different manner, thereby reducing the need to have two different sets of part for each installation orientation. As seen in FIGS. 1 and 2, the different positioning of controller 10 in the desktop and vertical orientations requires that display 18 be re-oriented with respect to its tilting relative to body 12 as well as the rotational orientation of display 18 relative to the tilt so that the display 18 is always uprights and tilted for easier viewing by a locomotive engineer.

Figure 3:
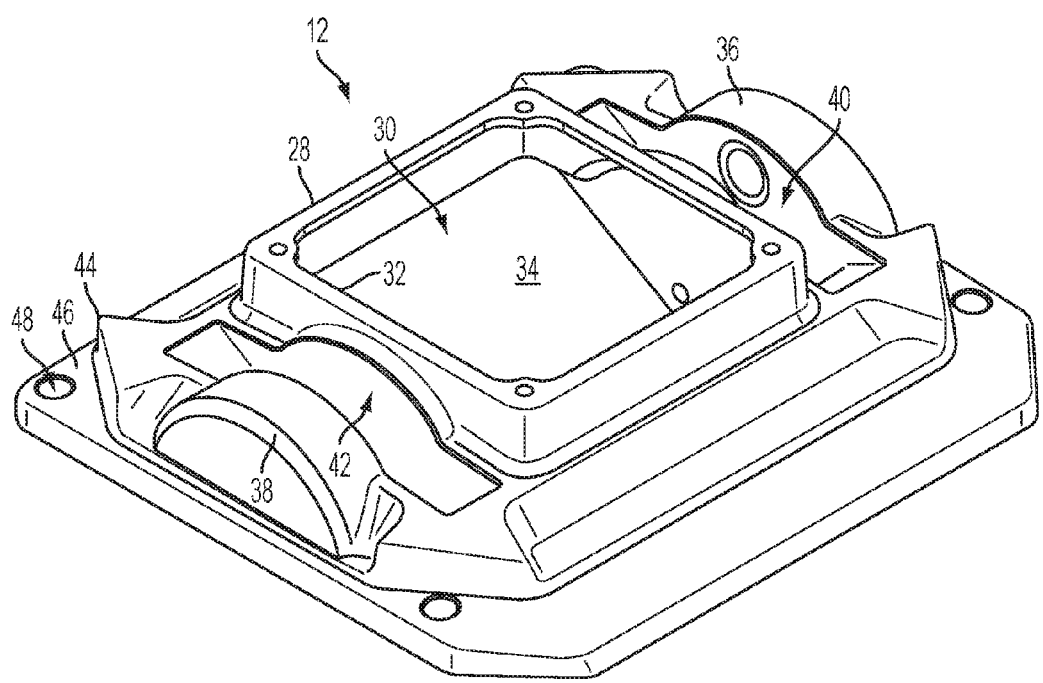
FIG. 3 is a perspective view of the main body of a locomotive brake controller according to the present invention.

Referring to FIG. 3, body 12 of controller 10 includes a central bracket 28 for supporting operator interface module 14 and opening 30 within bracket 28 to allow for interconnection of operator interface module 14 to the components and wiring harness of the braking system located beneath or behind controller 12. Central bracket 28 includes a lip 32 having a series of mounting holes 34 for supporting operator interface module 14 and mounting module 14 to bracket 28 using fasteners that engage mounting holes 34. Body 12 further includes a pair of handle housings 36 and 38 having slots 40 and 42 formed therethrough for housing operator handles 20 and 22, respectively. The outer perimeter of body 12 includes a shoulder 44 positioned at each of the corners of body 12 to define a series of flange sections 46, preferably located at each corner of body 12. Each flange section 46 includes an opening 48 that is positioned to allow body 12 to be interconnected to a conventional desktop mount in a locomotive cab via fasteners such as bolts or screws positioned through openings 48. For example, one conventional desktop mount requires opening 48 to be spaced apart nine and ⅛ inches laterally and six inches and 21/32 seconds apart longitudinally. If controller 10 is to be mounted to a vertical stand, however, openings 48 will not be positioned in the appropriate location as a conventional AAR stand requires opening that are spaced apart nine and ¼ inches horizontally and ten and ⅜ inches vertically.

Figure 4:
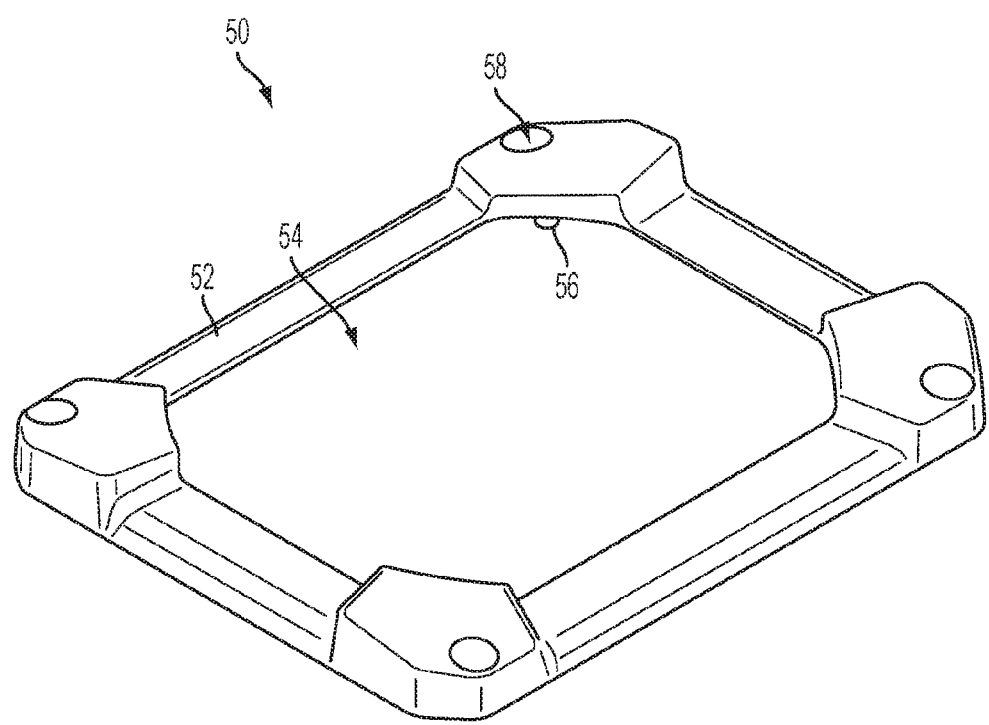
FIG. 4 is perspective view of a vertical installation adaptor for a locomotive brake controller according to the present invention.

Referring to FIG. 4, controller 10 comprises a mount 50 for mounting body 12 of controller 10 to a vertical stand in a locomotive cab. Mount 50 comprises a frame 52 defining a central opening 54 that can be positioned in covering relation to the outer perimeter of body 12 so that central bracket 28, opening 30, and handle housings 36 and 38 to extend therethrough. Frame 52 closely abuts shoulders 44 of body 12 and includes a series of bosses 56 that align with openings 48 of flange sections 46 so that mount 50 and body 12 may be connected together, such as by using fasteners that extend upwardly through openings 48 of body 12 into bosses 56 of mount 50 to securely attach body 12 and mount 50 together. Alternatively, mount 50 and body 12 may be secured together using barbed posts that engage opening 48, by snap fitting mount 50 and body 12 together, by friction fit, or even by the use of adhesives such as epoxy. As seen in FIG. 1, mount 50 and body 12 are designed to be correspondingly shaped so that, when secured together through whatever means in desires, mount 50 tightly encloses the outer perimeter of body 12 with only a narrow seam left there between and while still allowing unfettered access to operator interface module 14 and handles 20 and 22.

As seen in FIG. 4, mount 50 further comprises a series of mounting holes 58 that are positioned in the corners of mount 50 and aligned to allow holes 58 to be used to mount directly to vertical standthereby securing body 12 to the vertical stand when mount 50 has been positioned in covering relation and secured to body 12. It should be recognized that the locations of mounting holes 58 are selected to correspond to vertical stand in the cab of a locomotive, such as by positioning holes 58 in the appropriate locations according to existing standard AAR stand dimensions as discussed above, and can otherwise be positioned to correspond to any stand currently in use or placed into use in the future.

Figure 5:
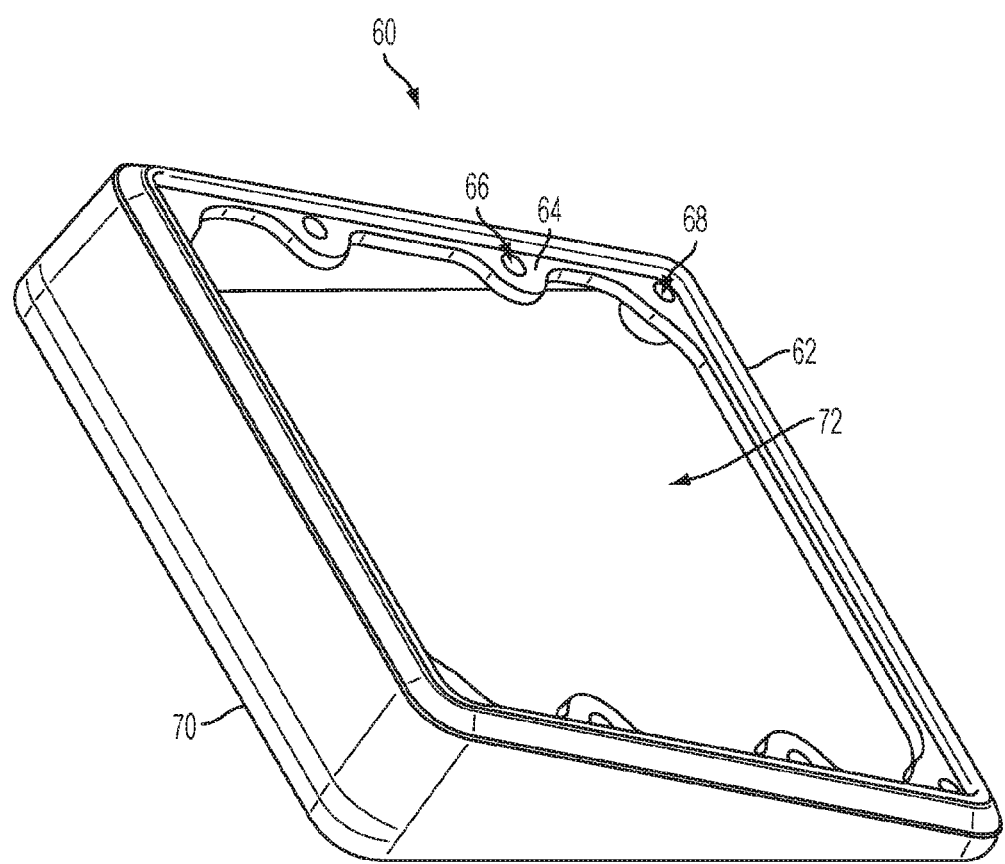
FIG. 5 is a perspective view of an operator interface mount for a locomotive brake controller according to the present invention.

Referring to FIG. 5, controller 10 further comprises a repositionable wedge adaptor 60 that is beveled to define a front face 62 that extends along a first plane and includes a series of mounting tabs 64 having openings 66 formed therethrough and a mounting surface 64. Front face 62 of adaptor 60 also includes a second set of openings 68 aligned to cooperate with mounting holes 34 of central bracket 28 so that adaptor 60 can be attached to body 12. As seen in FIGS. 3 and 5, central bracket 28 and adaptor 60 are generally square and opening 68 and mounting holes 34 are positioned in the corners of both central bracket 28 and adaptor 60. As a result, adaptor 60 and body 12 may be clocked at various 90 degree orientations relative to each other. As seen in FIG. 5, adaptor 60 is beveled to define a second, rear 70 that extends along a second plane that is non-parallel to first plane of front face 62. As a result, adaptor 60 will tilt operator interface 14 relative to body when second side 70 is positioned in abutting relation to body 12, and the direction of the tilt may be adjusted by clocking adaptor 60 relative to body and then securing it thereto, thus allowing body 12 and mount 50 to be used in either a desktop or vertical orientation while providing the appropriate tilting of operator interface in either orientation. Front side 62 and rear side 70 define a central window 72 that permits interconnection of operator interface 14 with electronics housed in or behind body 12.

Figure 6:
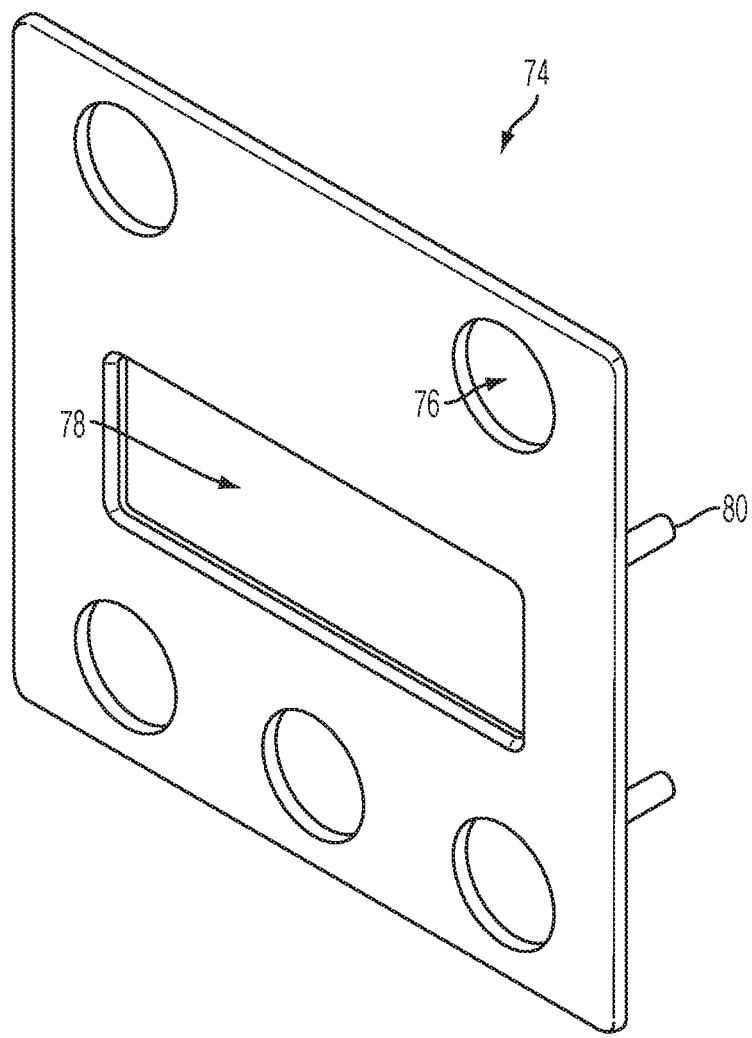
FIG. 6 is a perspective view of an operator interface face plate for a locomotive brake controller according to the present invention.
Figure 7:
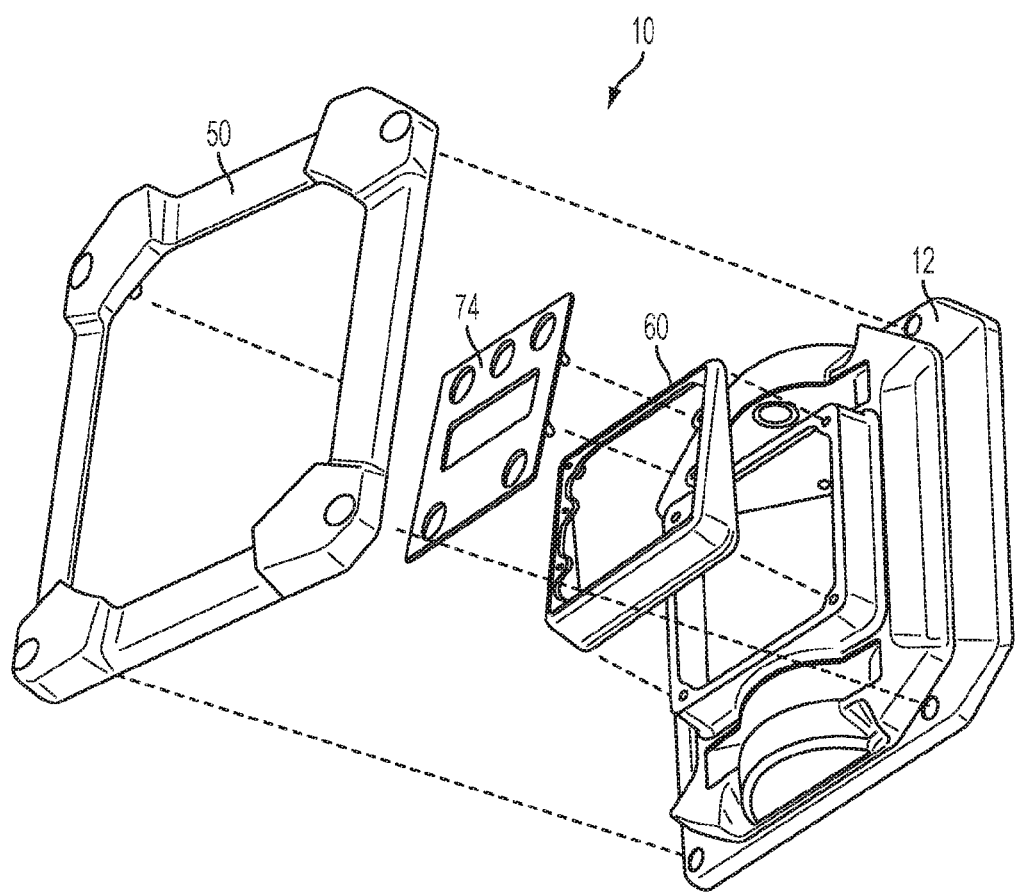
FIG. 7 is a exploded perspective view showing assembly of a locomotive brake controller according to the present invention.

Referring to FIG. 6, operator interface 14 includes a face plate 74 having a series of opening 76 formed therethrough for accepting operator buttons 16 as well as a central opening 78 for display 18. Face plate 74 further comprises a series of posts 80 extending outwardly from the rear surface of face plate 74 to allow for interconnection of face plate 74 to mounting tabs 64 and openings 66 of adaptor 60. Tabs 64 and opening 66 are positioned along corresponding lateral sides of adaptor 60 and face plate 74, thereby allowing face plate 74 to be attached to adaptor 60 in a first orientation or a second orientation that is at 180 degrees to the first orientation. As a result, face plate 74 can be clocked at 180 degrees relative to adaptor 60 depending on whether adaptor 60 has been clocked at 90 degree orientations relative to body 12 for a desktop installation or a vertical stand installation. Thus, the movement of adaptor 60 relative to body 12 and face plate 74 relative to adaptor 60 will allow controller 10 to be properly positioned with respect to the tilting of operator interface 14 and the orientation of buttons 16 and display 18 in either the vertical installation, as seen in FIG. 1, or a desktop installation, as seen in FIG. 2, without the need for different parts that are specific to each installation. As seen in FIG. 7, interconnection of all elements of controller 10 provides allows for installation in a vertical orientation. For desktop installations, mount 50 may be omitted, and adaptor 60 may be clocked 90 degrees and face plate 74 clocked 180 degrees to re-orient operator interface 14 to the appropriate position for easy viewing by an operator.

Figure 8:
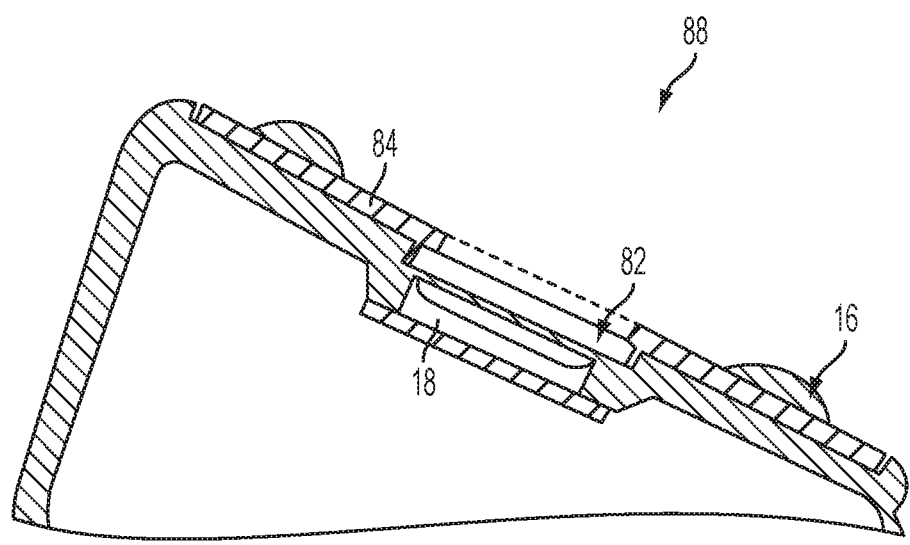
FIG. 8 is a cross-sectional view of another embodiment of an operator interface mount for a locomotive brake controller according to the present invention.

Referring to FIG. 8, adaptor 60 and face plate 74 could be formed as a single integral adaptor 80 having a window 82 positioned therein. The screen for display 18 may then be mounted behind window 82 in the appropriate orientation for vertical or desktop installation of controller 10. A membrane 84 including operator buttons 16 may then be applied in the appropriate orientation and adhered over the front surface of integral adaptor, thereby sealing window 82. As a result, membrane 84 can be clocked at either 180 orientation as needed for the particular installation and display 18 can be re-oriented behind window 82 to correspond to the particular orientation of membrane 84. As explained above, the appropriately shaped operator grips may be attached to handles 20 and 22 of controller 10 for a particular installation once installation of the rest of controller 10 is completed.

Figure 9:
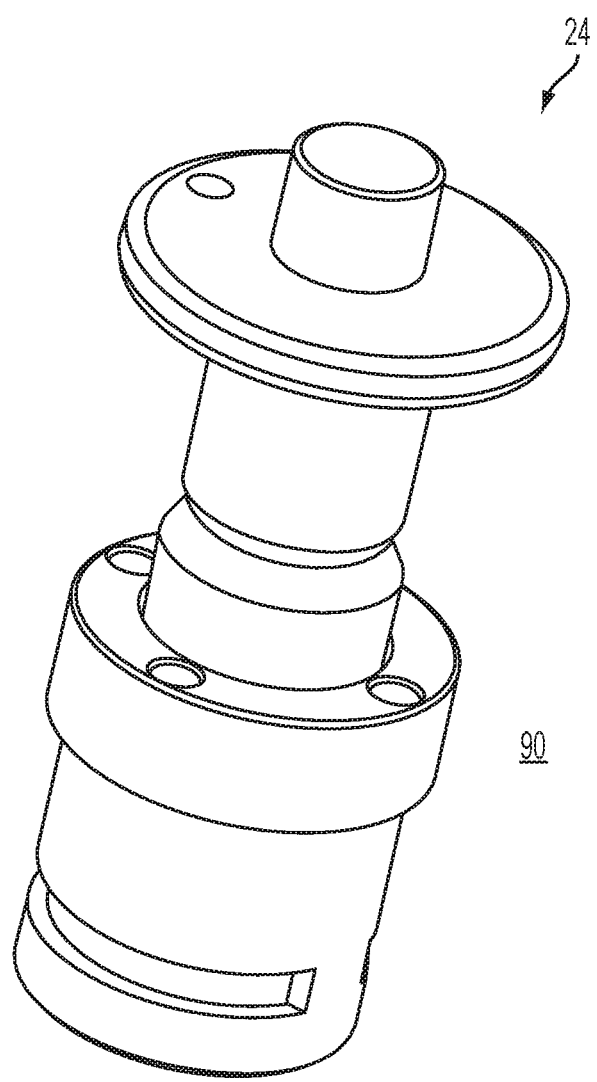
FIG. 9 is a perspective view of an embodiment of a locking pin according to the present invention.
Figure 10:
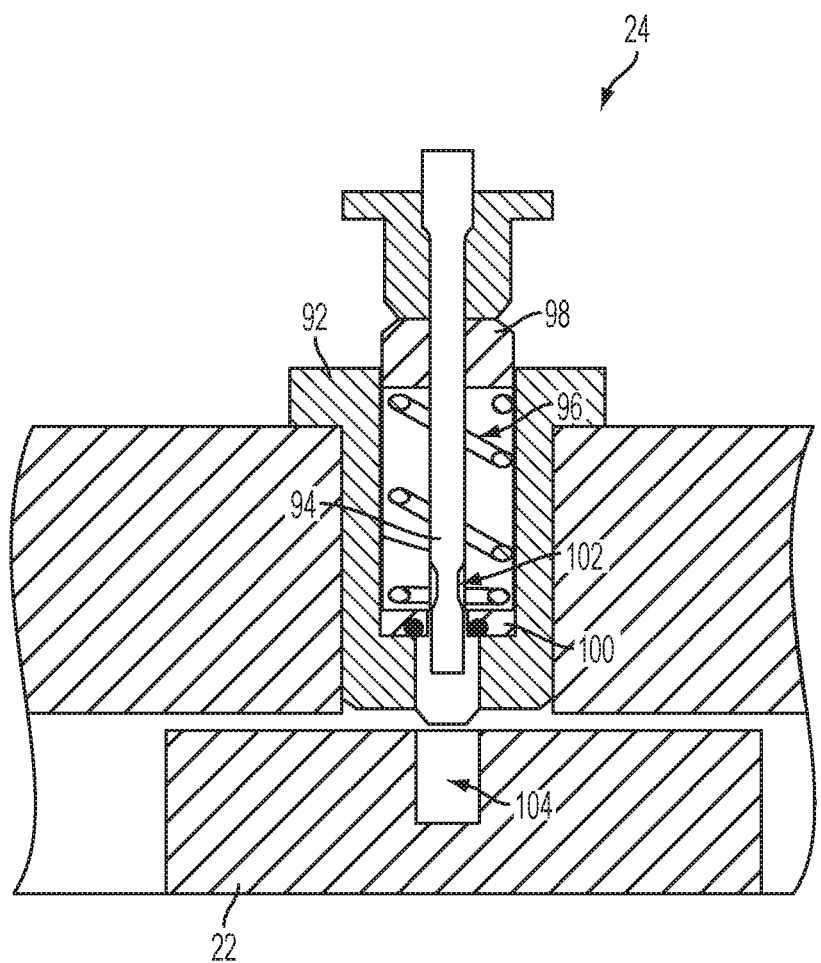
FIG. 10 is a cross-sectional view of an embodiment of a locking pin according to the present invention.

Referring to FIG. 9, locking pin 24 may comprise a modular unit 90 that can be removed for repair as a unit. Unit 90 may be threaded body 12, or held by a set screw or other known securing method. Unit 90 may be replaced by a plug when not needed to keep the casting and machining of body 12 the same for both vertical and desktop installations. As further seen in FIG. 10, unit 90 comprises an insert 92 that houses a pin 94 and spring 96 arrangement that is held in place by a bushing 98. Preferably, the locking pin 24 is biased by spring 94 to be in an unlocked position and held in place by biased keeper 100 that engages a detent 102 in pin 94 when moved into a locked position and holds pin 94 in place. In addition, in the locked position, pin 94 extends into the hub of handle 22 when handle 22 is placed into a 'handle off' or 'continuous service' position and prohibits movement of handle 22, such as by including a receiving slot 104 in handle 16 or 18 that accepts pin 92 only when handle 22 is in the appropriate position for locking. In another embodiment of locking pin 24 could include two detents 102, one for each of the unlocked and locked positions, thereby allowing for the omission of spring 96 if desired.

What is claimed is:

1. A brake controller for installation in a cab of a locomotive, comprising:
    a base having a first set of openings formed therethrough that are positioned to allow said brake controller to be affixed to a first predetermined location in the cab of the locomotive;
    a mount engaging the perimeter of said base and having a second set of openings formed therethrough that are positioned to allow said brake controller to be affixed in a second predetermined location in the cab of the locomotive that is different than said first predetermined location; and
    an operator interface supported within said base that is rotatable between at least two orientations where said operator interface may be fixed relative to said base.

2. The controller of claim 1, wherein said operator interface comprises an adaptor that is rotatable between at least two orientations relative to said base where said adaptor may be fixed relative to said base.

3. The controller of claim 2, wherein said adaptor is beveled so that said face plate extends along a plane that is tilted relative to said base.

4. The controller of claim 3, wherein said operator interface further comprises a face plate that is interconnected to said adaptor and rotatable between at least two positions relative to said mount.

5. The controller of claim 4, wherein said face plate includes a third set of openings formed therethrough for accepting a corresponding set of operator buttons and a window therein for permitting access to an operator display.

6. The controller of claim 1, wherein said adaptor includes a series of bosses positioned to allow said base to be fastened to said mount through said first set of openings and said series of bosses.

7. The controller of claim 6, wherein said base is fastened to said mount by fasteners that extend from said openings of said base into said bosses of said mount.

8. The controller of claim 1, wherein said operator interface includes a forward surface having a window formed therethough.

9. The controller of claim 8, wherein a display is positionable in either a first position behind said window or a second position that is 180 degrees offset from said first position.

10. The controller of claim 9, further comprising a membrane having pushbuttons formed therein adhered over the adaptor in covering relation to at least a portion of said window.

11. A brake controller for installation in a cab of a locomotive, comprising:
    a base having a central bracket defining a passageway through said base, a pair of opposing handle housings, and a perimeter edge defining a first set of openings configured to attach said brake controller to a first predetermined location in said locomotive;
    a mount having an outer frame dimensioned to engage said perimeter edge of said base while permitting access to said bracket and said handle housings, wherein said mount includes a second set of openings formed through said outer frame that are configured to attach said brake controller to a second predetermined location in said locomotive that is different than said first predetermined location; and
    an adaptor having a lower surface that extends along a first plane and an upper surface that extends along a second plane to define a bevel, wherein said adaptor is interconnected to said bracket in either a first position, wherein said bevel extends in a first direction, or a second position wherein said bevel extends in a second direction that is at a right angle to said first direction.

12. The controller of claim 11, wherein said adaptor includes a face plate.

13. The controller of claim 12, wherein said face plate is moveable between a first position and a second position that is 180 degrees offset from said first position.

14. The controller of claim 13, wherein said face plate is integrally formed into said adaptor.

15. The controller of claim 14, wherein said face plate includes a window formed therethough.

16. The controller of claim 15, wherein a display is positionable in either a first position behind said window or a second position that is 180 degrees offset from said first position.

17. The controller of claim 16, further comprising a membrane having buttons formed therein adhered over the adaptor in covering relation to at least a portion of said window.

* * * * *